US009286499B1

(12) United States Patent
Canini et al.

(10) Patent No.: US 9,286,499 B1
(45) Date of Patent: Mar. 15, 2016

(54) SCAN ENGINE WITH CONFIGURABLE COMMUNICATION INTERFACE

(71) Applicant: DATALOGIC IP TECH S.R.L., Lippo di Calderara di Reno (IT)

(72) Inventors: Federico Canini, Zola Predosa (IT); Stefano Fracassi, Calderara di Reno (IT); Riccardo Genovese, Bologna (IT)

(73) Assignee: Datalogic IP Tech S.r.l., Bologna (IT)

( * ) Notice: Subject to any disclaimer, the term of this patent is extended or adjusted under 35 U.S.C. 154(b) by 0 days.

(21) Appl. No.: 14/576,671

(22) Filed: Dec. 19, 2014

(51) Int. Cl.
*G02B 26/10* (2006.01)
*G06K 7/10* (2006.01)
*G06K 9/22* (2006.01)
*G06K 19/06* (2006.01)

(52) U.S. Cl.
CPC .................................. *G06K 7/10851* (2013.01)

(58) Field of Classification Search
CPC ........... G02B 26/10; G06K 7/10; G06K 9/22; G06K 19/06; G06K 9/38; H03G 3/32
USPC ............. 235/462.25, 462.26, 462.27, 462.29, 235/462.16
See application file for complete search history.

(56) References Cited

U.S. PATENT DOCUMENTS

2006/0192012 A1* 8/2006 Madej ...................... 235/462.27
2007/0222609 A1* 9/2007 Duron .................. G06K 7/0008 340/572.7

* cited by examiner

*Primary Examiner* — Edwyn Labaze
(74) *Attorney, Agent, or Firm* — Shook, Hardy & Bacon L.L.P.

(57) ABSTRACT

A system, apparatus, and methods for interfacing a scan engine for scanning optical code symbols and a decoder. The system employs a configurable communication interface configured to generate a relaxed DBP signal that is independent of the scanning distance or the scan rate used in a scanning operation using a DBP signal from the scan engine. A relaxed DBP signal may be generated by scaling a narrowest pulse in a pulse sequence to a fixed minimum pulse width. A relaxed DBP signal having transmission slots of a fixed duration may be generated by calculating a minimum pulse duration that enables transmission of a pulse sequence within the fixed duration. Upon scaling the narrowest pulse in a pulse sequence to the minimum pulse width, either fixed or calculated, the remaining pulses are scaled so as to maintain a relative proportionality of each pulse width in the pulse sequence.

20 Claims, 4 Drawing Sheets

SCAN ENGINE WITH CONFIGURABLE COMMUNICATION INTERFACE

CROSS-REFERENCE TO RELATED APPLICATIONS

Not applicable.

BACKGROUND OF THE INVENTION

Optical codes (e.g. bar codes) store data by encoding that data using geometric patterns set by established standards (i.e. symbologies). Therefore, the stored data is retrievable by reading the geometric patterns of the optical code and decoding the geometric patterns read using the appropriate symbology. For example, bar codes may represent encoded data through a series of adjacent bars having various widths that are separated by intervening spaces with a different reflectivity than the bars they separate. Optical scanners, such as bar code readers, read the geometric pattern of bars and spaces representing encoded data by receiving a portion of an emitted optical signal that is reflected by the bar code. Based upon the received portion of the optical signal, a DBP signal is generated that represents the varying reflectivity encountered by the optical signal during the scanning operation. In doing so, the DBP signal is a representation bar code's geometric pattern of bars and spaces read during the scanning operation. The DBP signal is forwarded to a decoder that retrieves the data by decoding the bar code's geometric pattern using the appropriate symbology.

Such DBP signals exhibit a temporal resolution that is closely related to the spatial resolution of the bar code as seen by the optical scanner during the scanning operation. DBP signal characteristics like pulse duration corresponding to the widths of adjacent bars are affected by this close relation between temporal and spatial resolution. For example, as the distance between the bar code and the optical scanner increases, the DBP's pulse durations decrease. The DBP's pulse durations also decrease as the scan rate used by the optical scanner increases, such as with high performance optical scanners designed with far field reading capabilities or equipped with high scan rate modules. This is problematic for some decoders with limited processing capability, such as those equipped with CPUs having lower processing speeds to reduce the decoder's cost. If the duration of the DBP's pulse widths decreases enough, the low-cost decoders cannot adequately measure their duration of due to the CPU's limited processing capability. When the duration of the DBP's pulse widths cannot be adequately measured, the low-cost decoder cannot retrieve the encoded data being represented by the scanned optical symbol. A configurable communication interface having selectable operating modes is needed to implement communication between optical scanners and decoders with different capabilities. Such interface would enable the integration of low-cost decoders and high performance optical scanners to provide an optical symbol scanning system retaining the cost savings provided by the decoder without sacrificing the optical scanner's reading performance.

BRIEF DESCRIPTION OF THE SEVERAL VIEWS OF THE DRAWINGS

In the accompanying drawings which form a part of the specification and which are to be read in conjunction therewith, and in which like reference numerals are used to indicate like parts in the various views.

DETAILED DESCRIPTION OF THE INVENTION

Figure 1:
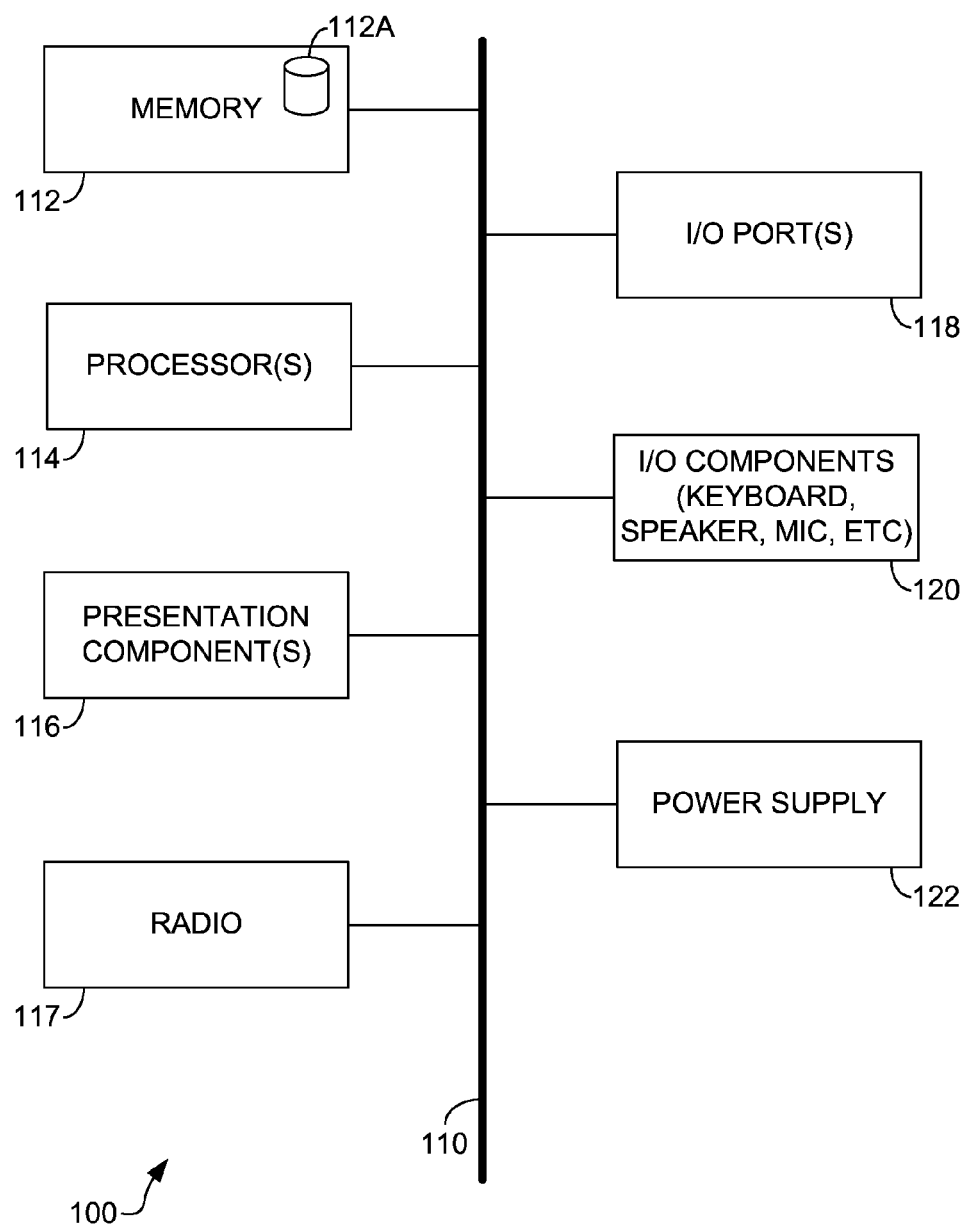
FIG. 1 depicts an exemplary operating environment for implementing embodiments of the present invention.

The subject matter of embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

1-D One-Dimensional
2-D Two-Dimensional
CD-ROM Compact Disc Read-only Memory
CPU Central Processing Unit
DVD Digital Versatile Disc
DBP Digital Bar Pattern
EE-PROM Electronically Erasable Programmable Read-only Memory
I2C Inter Integrated Circuit Communications
LAN Local Area Network
ms Millisecond
QR Code Quick Response Code
RAM Random Access Memory
ROM Read-only Memory
SOS Start of Scan
SPI Serial-Peripheral Interface
SYNC Synchronous In one embodiment, an apparatus for interfacing a scan engine for scanning optical code symbols and a decoder is provided. The apparatus includes an input communicatively coupled to the scan engine which is adapted to transmit a DBP signal that includes a plurality of optical code patterns each corresponding to an optical code symbol scanned by the scan engine. Each of the plurality of optical code patterns comprise a sequence of pulses having durations that are proportional to a width of a corresponding code element of the scanned optical code symbol. The apparatus is configured, for each optical code pattern received, to calculate a minimum pulse duration that enables transmission of that optical code pattern within a fixed duration. The apparatus is also configured to scale a narrowest pulse in the sequence of pulses to the minimum duration calculated for that optical code pattern. In embodiments, the apparatus generates a relaxed DBP signal comprised of a plurality of transmission slots of the fixed duration.

In another embodiment, an apparatus for interfacing a scan engine for scanning optical code symbols and a decoder is provided. The apparatus includes an input communicatively coupled to the scan engine which is adapted to transmit a DBP signal that includes a plurality of optical code patterns each corresponding to an optical code symbol scanned by the scan engine. Each of the plurality of optical code patterns comprise a sequence of pulses having durations that are proportional to a width of a corresponding code element of the scanned optical code symbol. The apparatus is configured to generate a relaxed DBP signal, independent of a scan rate used by the scan engine, which is comprised of a plurality of transmission slots of a variable duration. The apparatus is also configured to scale a narrowest pulse in the pulse sequence to a fixed minimum pulse duration, for each code pattern received. In embodiments, upon scaling the narrowest pulse in the pulse sequence, the apparatus is configured to scale remaining pulses in the pulse sequence to maintain a relative proportionality of each pulse width in the pulse sequence.

In yet another embodiment, a system for scanning optical code symbols is provided. The system includes a scan engine adapted to transmit a DBP signal comprised of a plurality of code patterns that each correspond to an optical code symbol scanned by the scan engine, and wherein each of the plurality of code patterns are comprised of a sequence of pulses having durations that are proportional to a width of a corresponding code element of the scanned optical code symbol. The system also includes a decoder adapted to retrieve data encoded in the scanned optical code symbols using a relaxed DBP signal comprised of a plurality of transmission slots. Also included is a configurable communication interface configured to generate the relaxed DBP signal using the DBP signal and communicatively coupled to the scan engine and the decoder, wherein the relaxed DBP signal is independent of both a scan rate used by the scan engine when scanning optical code symbols and a distance between optical code symbols and the scan engine during a scanning operation.

Exemplary Operating Environment

Having briefly described an overview of embodiments of the invention, an exemplary operating environment in which embodiments of the invention may be implemented is described below to provide a general context for various aspects of these embodiments. Referring to the figures in general and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the invention. Neither should computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a bar code scanner, scan engine, smart phone, point-of-sale device, or other computing device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, point-of-sale machines, etc. Embodiments of the invention may also be practiced in distributed computing environments where tasks are performed by remote-processing devices that are linked through a communications network.

As utilized herein, the phrase "computing device" generally refers to a dedicated computing device with processing power and storage memory, which supports operating software that underlies the execution of software, applications, and computer programs thereon. As one skilled in the art will appreciate, computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), application-specific standard products (ASSPs), system-on-a-chip (SOC), or complex programmable logic devices (CPLDs).

As understood by one skilled in the electrical engineering and computer science arts, through programming and/or storing computer-executable instructions in memories accessible by a computing device, at least one of a processor, cache memory, and/or long-term storage memory is changed. Consequently, a computing device of general functionality is reconfigured because of this change, and thus is transformed into a particular machine or apparatus with novel functionality that is described herein as computing device 100. Such novel functionality including a scan engine with a configurable communication interface adapted to generate a relaxed DBP signal that is independent of both a scan rate used by the scan engine when scanning optical code symbols and a distance between optical code symbols and the scan engine during a scanning operation. Furthermore, this same novel functionality can be reformed into a variety of equivalent hardware logic implementations through design rules well known to those skilled in the electrical engineering and computer science arts. For example, this same novel functionality can be implemented in hardware logic implementations such as an FPGA, ASIC, ASSP, SOC, CPLD, and the like.

With continued reference to FIG. 1, computing device 100 includes a bus 110 that directly or indirectly couples the following devices: memory 112, one or more processors 114, one or more presentation components 116, radio 117, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that is accessible by the computing device 100 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, diode, speaker, printing component, vibrating component, etc.

Radio 117 functions to send and receive signals from a network, such as a LAN network. I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the invention are generally directed to systems, methods, and computer-readable media that, among other things, a scan engine with a configurable communication interface having selectable operating modes to implement communication between the scan engine and a remote decoder. The configurable communication interface provides the adaptability to integrate the scan engine with remote decoders of various capabilities.

Exemplary Scanning Environment

Figure 2:
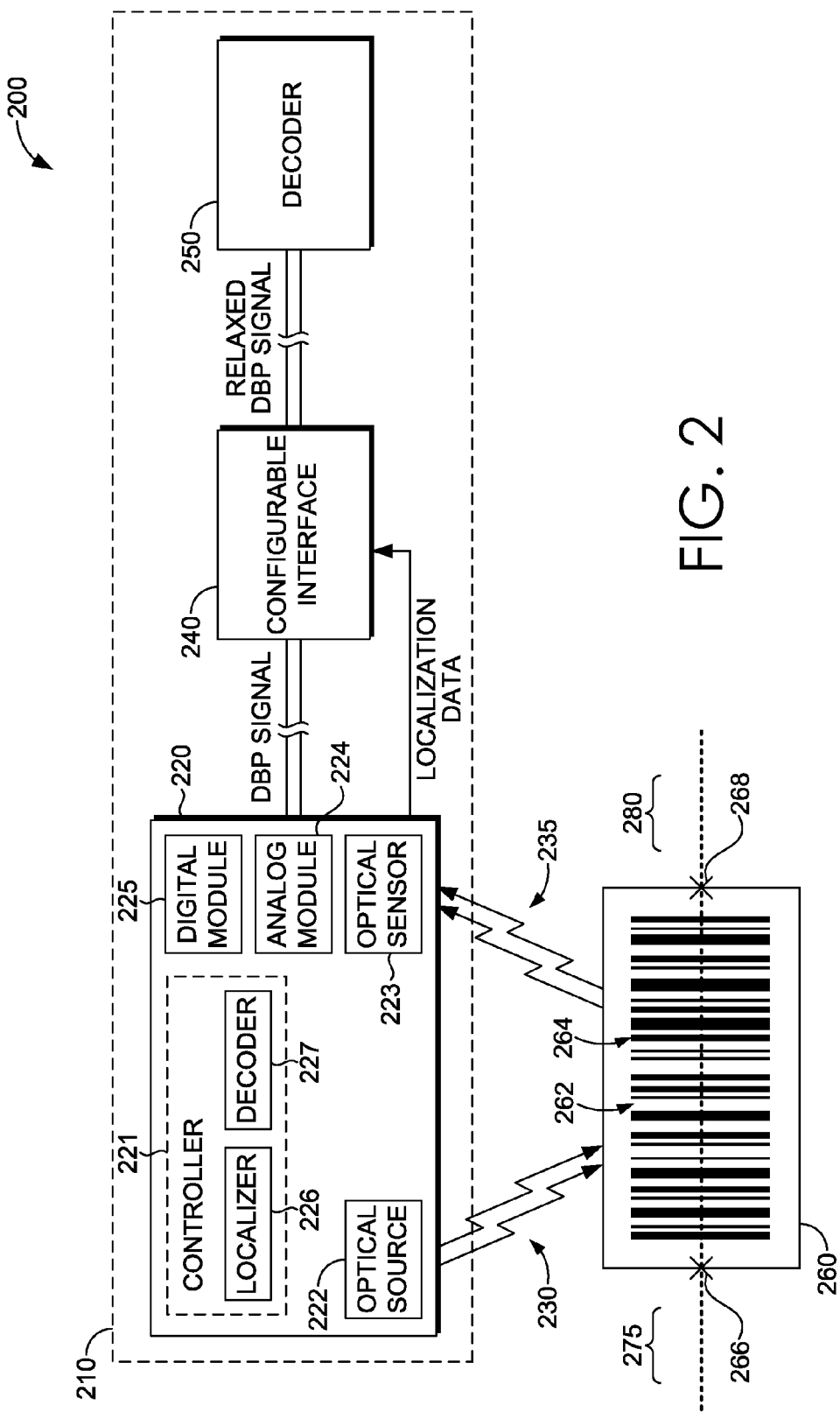
FIG. 2 depicts an embodiment of an optical code reader usable to acquire data stored in optical symbols, bar codes, or other machine-readable symbols.

Referring now to FIG. 2, optical code reader 210 is depicted in scanning environment 200 that is usable to acquire data stored in optical symbols, bar codes, or other machine-readable symbols, such as bar code 260. In scanning environment 200, optical code reader 210 is comprised of scan engine 220 and decoder 250. Upon scanning bar code 260, scan engine 220 forwards signals to decoder 250 via configurable interface 240 that correspond to reflected portions 235 of optical signal 230 reflected by bar code 260.

In some embodiments, data is encoded in an optical symbol using a linear or 1-D symbology that represents data through a plurality of code elements along a single physical dimension. For example, if the optical symbol is a bar code, the data encoded in the optical symbol is represented through alternating dark and light areas of the bar code along a single axis. As such, optical code readers may retrieve the data encoded with a 1-D symbology by way of a single scan along that single axis. In this example, the alternating dark and light areas representing data encoded in the optical symbol are defined by series of adjacent bars having various widths that are separated by intervening spaces with a different reflectivity than the bars they separate.

In some embodiments, data may be encoded in an optical symbol using a matrix or 2-D symbology by representing data through a plurality of code elements along two physical dimensions (e.g. both horizontally and vertically). For example, if the optical symbol is a QR Code™ provided by the Denso Wave Corporation of Agui-cho, Japan, the data encoded could also be represented through alternating dark and light areas with a different reflectivity than dark areas. In this example, the alternating dark and light areas of the optical symbol are defined by 2-D code elements of varying size, position, shape, orientation, and the like. As such, optical code readers must obtain both the horizontal and vertical relationships of the geometric patterns in order to retrieve the data encoded with a 2-D symbology. In this example, an optical symbol could further include one or more reference locators to convey position, alignment, and/or timing information about the optical symbol to a scan engine.

Some embodiments of the present invention are described herein in terms of a bar code for the sake of enablement. However, embodiments are not limited to a bar code, but rather may include any type of optical symbol that provides similar functionality to bar codes, such as any optical machine-readable code representing data using either a 1-D or 2-D symbology.

Scan engine 220 comprises controller 221, optical source 222, optical sensor 223, analog module 224, and digital module 225. In operation, while bar code 260 is in proximity of scan engine 220, controller 221 initiates a scanning operation by enabling optical source 222 and transitioning an SOS signal from a low voltage level, or a logical low, to a high voltage level, or a logical high (or vice versa). The transitioning of the SOS signal marks the beginning or end of a particular scanning operation. Accordingly, the SOS signal is usable to distinguish information received in one scanning operation from that received during another scanning operation.

Once enabled, optical source 222 emits an optical signal 230 upon bar code 260 along a single axis in the embodiments when data is encoded with a 1-D symbology. Upon reaching bar code 260, light areas (or spaces) 262 reflect a portion 235 of optical signal 230, while dark areas (or bars) 264 absorb a portion of optical signal 230. As such, reflected portions 235 of optical signal 230 are only available to optical sensor 223 (e.g. a linear charge coupled device (CCD) sensor, a complementary metal oxide semiconductor (CMOS) sensor, and the like) during periods that optical signal 230 is incident upon the spaces 262 of bar code 260. These reflected portions 235 are received by optical sensor 223 and converted into time-varying pulses of electrical current as optical sensor 223 cycles between off and on as optical signal 230 is received. The time-varying electrical current is therefore a series of electrical current pulses corresponding to the light and dark transitions (i.e. bars and spaces) of bar code 260.

Analog module 224 converts the electrical current into an analog signal comprising an electrical voltage proportional to the received electrical current. Digital module 225 converts the analog signal into a binary representation of bar code 260 (or code pattern). In general, the bar code pattern representing bar code 260 is characterized by a series of rectangular pulses (or pulse sequence), with each pulse duration corresponding to the width of a code element (e a bar or space) of the scanned bar code. Therefore, a decoder may retrieve the information encoded in a bar code by easuring the width (or duration) of each pulse in the code pattern resulting from scan engine 220's scanning of bar code 260. The pulse sequences are forwarded for decoding as a DBP signal. As such, the DBP signal ultimately used to retrieve data encoded in bar code 260, originates with a time-varying electrical current proportional to the intensity of the reflected portions 235 of optical signal 230 reflected by bar code spaces 262 as received by optical sensor 223.

Accordingly in order to accurately retrieve the encoded data, decoder 250 must be able to accurately measure the duration of each rectangular pulse corresponding to a scanned code element (e.g. bar or spaces) of the DBP signal. However, the duration of these rectangular pulses (or pulse widths) vary as a result of various factors impacting optical signal 230 because of the close relation between temporal and spatial resolution of the DBP signal. For example, as the distance between optical source 222 and bar code 260 increases, the amount of time that a measurable level of the reflect portion 235 of optical signal 230 is available to optical sensor 223 decreases. This is due, in part, to the attenuation of optical signal 230 (gradual reduction of optical signal 230's intensity) as it propagates to and from bar code 260 as a result of such physical effects as scattering, absorption, and the like. If scan engine 220 increases its scan rate, the frequency of optical signal 230 increases, which corresponds to a decrease in the periodic time (or duration) of optical signal 230. Consequently, the amount of time that a measureable level of the reflected portion 235 of optical signal 230 is available to optical sensor 223 similarly decreases.

To "relax" the timing constraints of the DBP signal created by the close relationship between temporal and spatial resolution, digital module 225 forwards the DBP signal to configurable interface 240. Upon receiving the DBP signal, configurable interface 240 is configured to forward a relaxed DBP signal to decoder 250, as discussed in greater detail below. The pulse widths comprising relaxed DBP signal are independent of both the scan rate used by scan engine 220 and the distance between optical source 222 and bar code 260. Thereby reducing the processing capacity required by decoder 250 to retrieve the encoded data. As such, decoder 250 may accurately measure the pulse width durations even with a limited processing capability, and thus accurately retrieve the encoded data.

In some embodiments, the relaxed DBP signal is forwarded to decoder 250 via configurable interface 240 for decoding to retrieve the data encoded in bar code 260. In these embodiments, decoder 250 is adapted to convert the relaxed DBP signal into computer-readable decoded data for further action, transmission, and/or storage. In other embodiments, scan engine 220 further comprises decoding module 227 adapted to decode the data encoded in bar code 260. In those embodiments, the relaxed DBP signal carries computer-readable decoded data that is forwarded to decoder 250 via configurable interface 240 for further action, transmission, and/or storage. Accordingly, decoder 250 is not required to convert the relaxed DBP signal as the data encoded in bar code 260 was already deciphered by scan engine 220.

In another embodiment, scan engine 220 further comprises a localizer module 226 adapted to provide a decoder and/or configurable interface 240 with localization data. The decoder and/or configurable interface 240 may use the localization data to identify portions of the DBP signal corresponding to code pattern. During a scanning operation, some portions of the DBP signal correspond to a code pattern resulting from scanning of bar code 260. However, some portions of the DBP signal correspond to spurious transitions resulting from scanning of background regions (e.g. the regions associated with designators 275 and 280) surrounding bar code 260. In some embodiments, the localization data may be encoded in the DBP signal as uniquely identifiable sequences. For example, the localization data may be appended to the DBP signal as a prefix and/or a postfix at the beginning and end of DBP signal portions corresponding to a code pattern. In some embodiments, the localization data may be provided as an additional, independent signal. In other words, localizer module 226 delineates the code pattern within the DBP signal using the localization data. Accordingly, localizer module 226 allows configurable interface 240 to only transmit DBP signal portions that correspond to code patterns in a relaxed DBP signal. In further embodiments, scan engine 220 may further comprise both decoder module 227 and localizer module 226.

Figure 3:
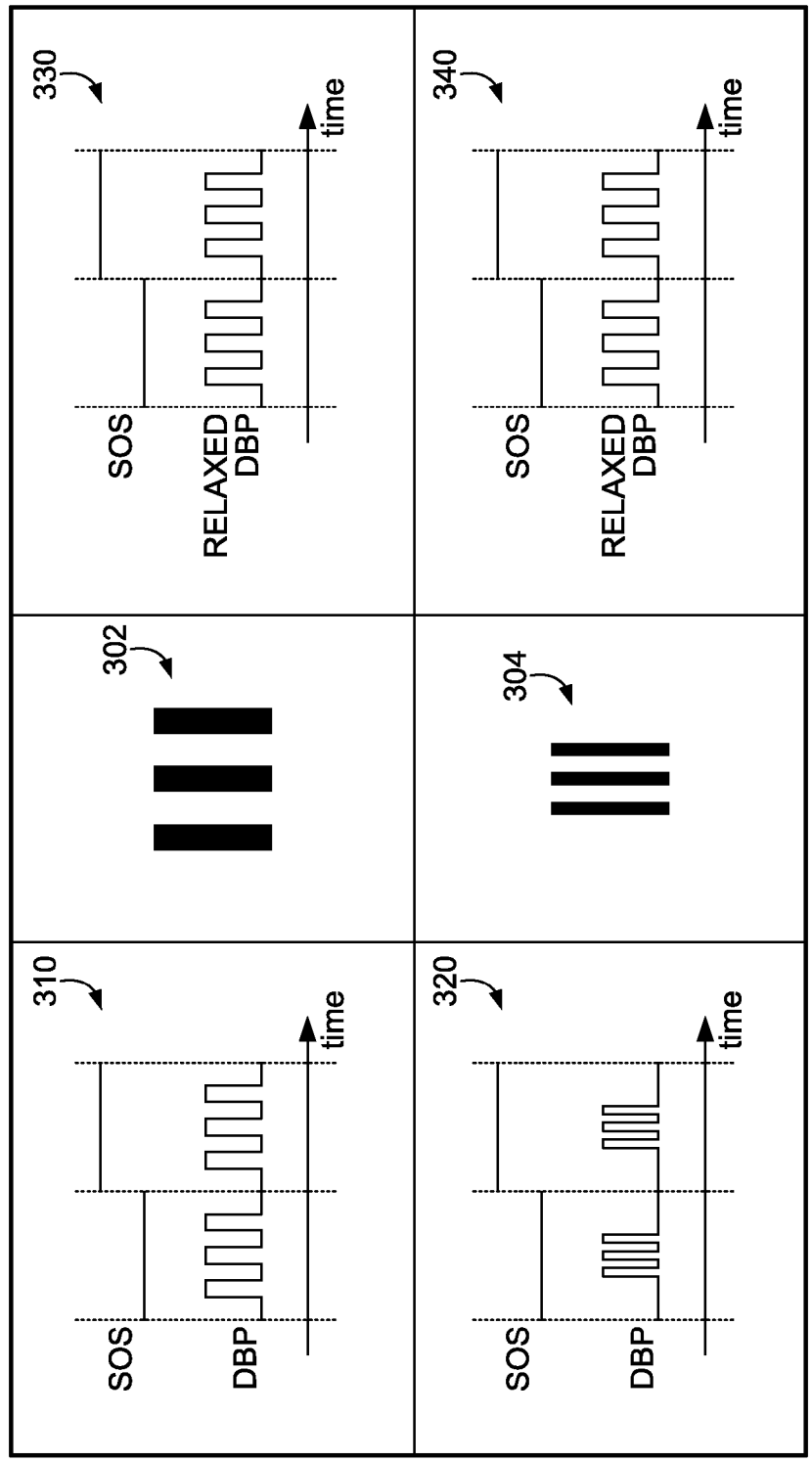
FIG. 3 depicts embodiments of waveform diagrams of DBP signal and relaxed DBP signal outputs resulting from scans of a bar code located in both the nearfield and farfield regions.

FIG. 3 depicts waveform diagrams of DBP signal and relaxed DBP signal outputs resulting from scans of a bar code located in both the nearfield and farfield regions. The waveform diagrams depicted by FIG. 3 are plotted as voltage level (y-axis) versus time (x-axis). In FIG. 3, the same bar code is represented in both the nearfield and farfield regions of a scan engine by designators 302 and 304, respectively. As shown by, FIG. 3, as the bar code transitions from the scan engine's nearfield region (i.e. 302) to the scan engine's farfield region (i.e. 304), the pulse width duration of the resulting DBP signals (310 and 320, respectively) vary. That is, the duration of the nearfield DBP signal 310's pulse widths are noticeably longer than the duration of the farfield DBP signal 320's pulse widths even though the bar code's physical dimensions are the same. However, as the bar code transitions from the scan engine's nearfield region (i.e. 302) to the scan engine's farfield region (i.e. 304), the pulse width durations of the resulting relaxed DBP signals (330 and 340, respectively) remain unchanged. That is, the duration of the nearfield relaxed DBP signal 330's pulse widths are the same as the duration of the farfield relaxed DBP signal 340's pulse widths. Accordingly, the relaxed DBP signal is independent of the distance of the bar code from the scan engine.

Figure 4:
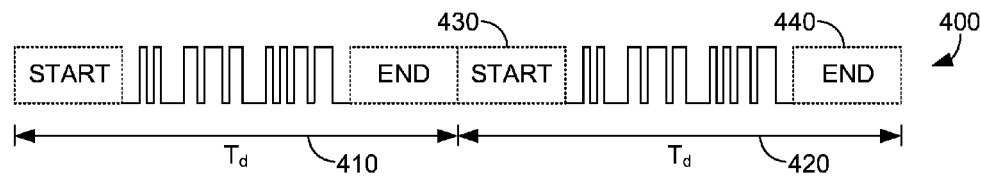
FIG. 4 depicts a relaxed DBP signal waveform diagram, in accordance with embodiments of the invention.
Figure 5:
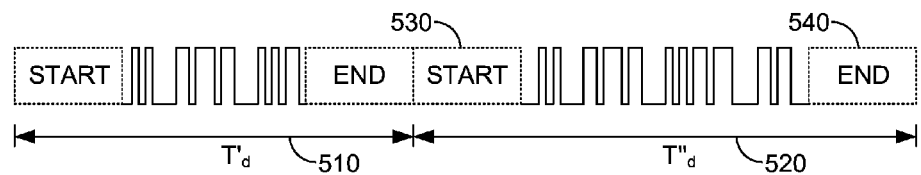
FIG. 5 depicts another relaxed DBP signal waveform diagram, in accordance with embodiments of the invention.
Figure 6:
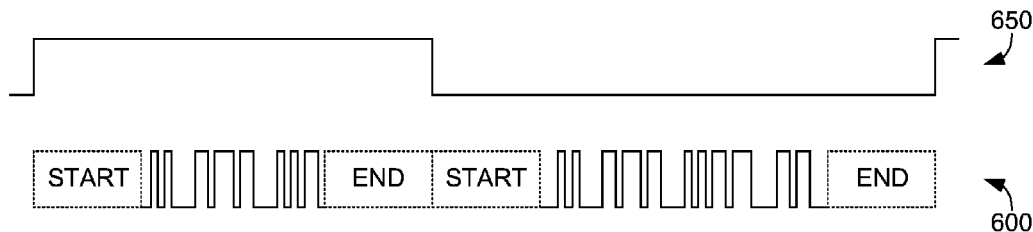
FIG. 6 depicts another relaxed DBP signal waveform diagram, in accordance with embodiments of the invention.

FIGS. 4-6 depict embodiments of relaxed DBP signal waveform diagrams according to the present invention. In the embodiments depicted by FIGS. 4-6, a configurable interface (e.g. configurable interface 250 of FIG. 2) is adapted to receive a DBP signal, of any length, from a scan engine corresponding to a scanned optical symbol. Upon receiving the DBP signal, the configurable communication interface is configured to forward a relaxed DBP signal in the form of one of the embodiments depicted in FIGS. 4-6. As a result, a decoder is provided with a DBP signal that is independent of both the scan rate used by the scan engine as well as the distance of the scanned optical symbol from the scan engine. Any aspect of the configurable interface, including the relaxed DBP signal it outputs, may either be selected at runtime by a user of the associated scan engine or set by a manufacturer in advance.

The high logic levels of the relaxed DBP signal waveform diagrams could correspond to the spaces of the scanned optical symbol, while the low logic levels correspond to the bars. Alternatively, the high logic levels of the relaxed DBP signal waveform diagram could correspond to the spaces of the scanned optical symbol, while the low logic levels correspond to the bars. Similar to the DBP signals discussed above with respect to FIG. 2, the relaxed DBP signals comprise a series of pulses whose duration correspond to the widths of the scanned optical symbol's code elements (e.g. bars or spaces). By "relaxing" the DBP signal received from the scan engine, a decoder can accurately decode information stored in the optical symbol, regardless of its available processing capability.

FIG. 4 depicts an embodiment of a relaxed DBP signal waveform diagram 400 with a fixed time slot per scan line. In this embodiment, a minimum pulse duration corresponding to the width the scanned optical symbol's code elements (e.g. bars or spaces) is not provided beforehand. The duration of the time slot during which relaxed DBP signal 400 will be transmitted; however, is provided beforehand. For every fixed time slot, the minimum pulse duration is calculated once the duration of the DBP signal to be transmitted in a particular time slot is known. In some embodiments, a minimum threshold for the minimum pulse duration may be established beforehand in order to ensure the decoder can accurately measure the pulse durations.

Relaxed DBP signal 400 is generated by scaling a DBP signal from every scan operation to fit within the fixed time slot duration while maintaining the relative proportionality of each pulse width. For example, a scan operation results in a DBP signal having a 100 ms duration comprising a first code element pulse with a 5 ms duration followed by a second code element pulse with a 10 ms duration. If the fixed time slot is set at 200 ms, the scan engine of this example would output a relaxed DBP signal 400 having a 200 ms duration comprising a first code element pulse with a 10 ms duration followed by a second code element pulse with a 20 ms duration. As such, every time slot of relaxed DBP signal 400 has the same fixed duration even if the duration of the resulting DBP signal varies from one scanning operation to the next. Therefore, first time slot 410 and second time slot 420 would have the same fixed duration even if first time slot 410 contains a DBP signal resulting from the scan of an optical symbol twice as long as second time slot 420.

In some embodiments, the scan engine could append relaxed DBP signal 400 with START prefix 430 and/or END postfix 440. START prefix 430 and END postfix 440 may each be comprised of uniquely identifiable sequences to identify a beginning and ending of the fixed time slot, respectively. For example, START prefix 430 could be a simple logic high to logic low transition prior to relaxed DBP signal 400 to identify a beginning of the fixed time slot. Similarly, END postfix 440 could be a simple logic low to logic high transition after relaxed DBP signal 400 to identify an ending of the fixed time slot. However, more complicated sequences of logic transitions could be used for START prefix 430 and/or END postfix 440.

In some embodiments, a decoder could disregard any relaxed DBP signal that does not comprise START prefix 430 and/or END postfix 440. Alternatively, the scan engine could append relaxed DBP signal 400 with an INVALID prefix (not shown) instead of START prefix 430 when the scan engine determines an invalid DBP signal is present. For example, the scan engine could determine that a DBP signal not comprising a minimal number of logic transitions or minimal amplitude is invalid, and thus does not correspond with a valid optical symbol. In these embodiments, an invalid DBP signal could quickly be ignored by the decoder so that its computational capacity could be reallocated to other tasks instead of attempting to decode the invalid DBP signal. This functionality may be advantageous when scan operations are preformed over uniformly colored surfaces (e.g. all white) or when noise is introduced to the relaxed DBP signal.

In some embodiments where scan engines with internal decoders are used, such scan engines could append relaxed DBP signal 400 with an UNDECODED prefix (not shown) when the scan engine is unable to successfully decode a DBP signal. In these embodiments, the scan engine could inform an external, possibly more powerful, decoder expecting a decoded signal that relaxed DBP signal 400 remains encoded. The external decoder could process relaxed DBP signal 400 accordingly to recover the encoded information.

FIG. 5 depicts an embodiment of a relaxed DBP signal waveform diagram 500 with a fixed minimum pulse duration and a variable time slot per scan line. In this embodiment, a minimum pulse duration corresponding to the width of bars (or spaces) is provided beforehand. The duration of the time slot during which relaxed DBP signal 500 will be transmitted; however, varies depending on duration of the DBP signal being transmitted. Relaxed DBP signal 500 is generated by scaling the smallest pulse duration of the DBP signal being transmitted to the fixed minimum pulse duration while larger pulse durations are scaled proportionately. For example, a scan operation results in a DBP signal having a 100 ms duration comprising a first code element pulse with a 5 ms duration followed by a second code element pulse with a 10 ms duration. If the fixed minimal pulse duration is set at 20 ms, the scan engine of this example would output a relaxed DBP signal 500 having a 400 ms duration comprising a first code element pulse with a 20 ms duration followed by a second code element pulse with a 40 ms duration.

As such, every time slot of relaxed DBP signal 500 may have the same minimum pulse duration. However, the duration of each time slot may vary depending on the overall duration of the resulting DBP signal being transmitted. Therefore, first time slot 510 and second time slot 520 would have the same fixed minimum pulse duration regardless of the minimum pulse width resulting from their respective scan operations. However, if first time slot 510 contains a DBP signal resulting from the scan of an optical symbol twice as long as second time slot 520, the duration of first time slot 510 would be twice that of second time slot 520. In some embodiments, a scan engine may append relaxed DBP signal 500 with a START prefix 530, an END postfix 540, an UNDECODED prefix, and/or an INVALID prefix as discussed above with respect to FIG. 4.

FIG. 6 depicts another embodiment of a relaxed DBP signal waveform diagram 600. As shown by FIG. 6, the present invention may be implemented with a two-wire interface communicatively coupling a scan engine and a decoder. A first interface line of the two-wire interface is designated as a DOUT line that carries relaxed DBP signal 600, which may be substantially similar to relaxed DBP signals 400 and/or 500. The second wire of the two-wire interface is designated as a LSYNC line may carry LSYNC signal 650. LSYNC signal 650 is used to identify a beginning of a time slot during which relaxed DBP signal 600 will be transmitted. Accordingly, LSYNC signal 650 is used to resynchronize the scan engine and decoder after each received optical symbol. In an embodiment, LSYNC signal 650 serves as an alternative to appending a relaxed DBP signal with a START prefix, an END postfix, an UNDECODED prefix, and/or an INVALID prefix as discussed above with respect to FIG. 4. In another embodiment, LSYNC signal 650 serves to complement appending relaxed DBP signal 600 with the various prefixes and/or postfixes discussed above.

Embodiments of the present invention may be implemented through a variety of one-wire and two-wire interfaces, as characterized according to Table 1 below. A DOUT interface line is configured to carry a relaxed DBP signal (e.g. relaxed DBP signals 400, 500, and/or 600). An LSYNC interface line is configured to carry an LSYNC signal (e.g. LSYNC signal 650 of FIG. 6) that may be used to resynchronize a scan engine and a decoder after each received optical symbol. In some embodiments, one or more of the operating modes described below may be used for bi-directional communication. In these embodiments, bi-directional communication enables modification of the configurable communication interface by a host (e.g. a decoder) without requiring reprogramming internal memory, such as firmware.

TABLE 1

| Interface Family | Operating Mode | Interface Lines | Direction (w.r.t. configurable interface) |
| --- | --- | --- | --- |
| SYNC | MASTER SYNC MODE | LSYNC | OUTPUT |
|  |  | DOUT | OUTPUT |
|  | SLAVE SYNC MODE | LSYNC | INPUT |
|  |  | DOUT | OUTPUT |
| ONE-WIRE | ONE-WIRE MASTER MODE | DOUT | OUTPUT |
|  | ONE-WIRE MIXED MODE | DOUT | OUTPUT |
| SERIAL | SPI | LSYNC → CLK | INPUT |
|  |  | DOUT → MOSI | OUTPUT |
|  | I2C | LSYNC → CLK | INPUT |
|  |  | DOUT → DATA | OUTPUT |

As shown by Table 1, some embodiments of the present invention may be implemented in either ONE-WIRE MASTER or ONE-WIRE MIXED operating modes. In an embodiment, one-wire interface operating modes only communicate a relaxed DBP signal and use the various prefixes and postfixes described above with regards to FIG. 4 to identify the beginning and/or end of a time slot. In the ONE-WIRE MASTER operating mode, the single interface line is designated as Data Output (DOUT) and is used to communicate data, such as a relaxed DBP signal, from a scan engine output to an input of a decoder. In the ONE-WIRE MIXED operating mode, the single interface line is also designated as DOUT, but is used for bi-directional communication of data between a scan engine and a decoder. As such, DOUT is concurrently serves as an input and output for both the scan engine and the decoder.

Some embodiments of the present invention may also be implemented as a two-wire interface that includes a SYNC interface family and a SERIAL interface family. The SYNC interface family includes a MASTER SYNC operating mode and a SLAVE SYNC operating mode. The SERIAL interface family supports an I2C operating mode and an SPI operating mode. In the MASTER SYNC operating mode, a first interface line is designated as a scan engine LSYNC output while a second interface line is designated as a scan engine DOUT output. In the SLAVE SYNC operating mode, a first interface line is designated as a scan engine LSYNC input while a second interface line is designated as a scan engine DOUT output. In the SPI operating mode, a Serial Clock (SCLK) line is designated as a scan engine LSYNC input while a Master Out-Slave In (MOSI) line is designated as a scan engine DOUT output. In an embodiment, a CS signal in the SPI-SERIAL operating mode is always assumed to be asserted (e.g. a constant logic high/low). In another embodiment, the CS signal in the SPI-SERIAL operating mode is replaced by a third signal that is used as a STANDBY pin. In the I2C operating mode, a SCL clock line is designated as a scan engine LSYNC input while a DATA line is designated as a scan engine DOUT output.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An apparatus for interfacing a scan engine for scanning optical code symbols and a decoder, the apparatus comprising:
    an input communicatively coupled to the scan engine, wherein the scan engine is adapted to transmit a digitized bar pattern ("DBP") signal comprised of a plurality of code patterns that each correspond to an optical code symbol scanned by the scan engine, and wherein each of the plurality of code patterns are comprised of a sequence of pulses having durations that are proportional to a width of a corresponding code element of the scanned optical code symbol; and
    one or more processor coupled to the input and a computer-readable medium, which stores instructions executable by the one or more processors including:
        generating a relaxed DBP signal, independent of a scan rate used by the scan engine, that is comprised of a plurality of transmission slots of a fixed duration, wherein the relaxed DBP signal is one that is independent of a scan rate and independent of a distance between the optical code symbol and the scan engine during a scanning operation;
        for each code pattern received, calculating a minimum pulse duration that enables transmission of that code pattern within the fixed duration; and
        scaling a narrowest pulse in the pulse sequence to the minimum duration calculated for that code pattern.

2. The apparatus of claim 1, wherein the instructions stored by the computer-readable medium, further include upon scaling the narrowest pulse in the pulse sequence, scaling remaining pulses in the pulse sequence to maintain a relative proportionality of each pulse width in the pulse sequence.

3. The apparatus of claim 1, further comprising an output communicatively coupled to the decoder and adapted to transmit the relaxed DBP signal, wherein the decoder is configured to retrieve data encoded in the scanned optical code symbols using the relaxed DBP signal.

4. The apparatus of claim 1, wherein the minimum pulse duration for each of the plurality of transmission slots is not provided in advance.

5. The apparatus of claim 1, wherein the minimum pulse duration for each of the plurality of transmission slots is calculated upon receiving the code pattern to be transmitted in that particular transmission slot.

6. The apparatus of claim 1, wherein a lower limit duration is set for the minimum pulse duration such that the minimum pulse duration calculated for each code pattern received cannot fall below the lower limit duration.

7. The apparatus of claim 1, wherein the instructions stored by the computer-readable medium, further include appending at least one of the plurality of transmission slots with a START prefix adapted to indicate a beginning of that transmission slot, an INVALID prefix adapted to indicate that transmission slot does not contain a valid code pattern, an UNDECODED prefix adapted to indicate that transmission slot contains an undecoded code pattern, and/or a postfix adapted to indicate an end of that transmission slot.

8. An apparatus for interfacing a scan engine for scanning optical code symbols and a decoder, the apparatus comprising:
   an input communicatively coupled to the scan engine, wherein the scan engine is adapted to transmit a digitized bar pattern ("DBP") signal comprised of a plurality of code patterns that each correspond to an optical code symbol scanned by the scan engine, and wherein each of the plurality of code patterns are comprised of a sequence of pulses having durations that are proportional to a width of a corresponding code element of the scanned optical code symbol; and
   one or more processors coupled to the input and a computer-readable medium, which stores instructions executable by the one or more processors including:
      generating a relaxed DBP signal, independent of a scan rate used by the scan engine, that is comprised of a plurality of transmission slots of a variable duration, wherein the relaxed DBP signal is one that is independent of a scan rate and independent of a distance between the optical code symbol and the scan engine during a scanning operation;
      for each code pattern received, scaling a narrowest pulse in the pulse sequence to a fixed minimum pulse duration; and
      upon scaling the narrowest pulse in the pulse sequence, scaling remaining pulses in the pulse sequence to maintain a relative proportionality of each pulse width in the pulse sequence.

9. The apparatus of claim 8, further comprising an output communicatively coupled to the decoder and adapted to transmit the relaxed DBP signal, wherein the decoder is configured to retrieve data encoded in the scanned optical code symbols using the relaxed DBP signal.

10. The apparatus of claim 8, wherein the minimum pulse duration for each of the plurality of transmission slots is provided in advance.

11. The apparatus of claim 8, wherein a first transmission slot and a second transmission slot of the plurality of transmission slots do not have equivalent durations.

12. The apparatus of claim 8, wherein the instructions stored by the computer-readable medium, further include appending at least one of the plurality of transmission slots with a START prefix adapted to indicate a beginning of that transmission slot, an INVALID prefix adapted to indicate that transmission slot does not contain a valid code pattern, an UNDECODED prefix adapted to indicate that transmission slot contains an undecoded code pattern, and/or a postfix adapted to indicate an end of that transmission slot.

13. A system for scanning optical code symbols comprising:
   a scan engine adapted to transmit a digitized bar pattern ("DBP") signal comprised of a plurality of code patterns that each correspond to an optical code symbol scanned by the scan engine, and wherein each of the plurality of code patterns are comprised of a sequence of pulses having durations that are proportional to a width of a corresponding code element of the scanned optical code symbol;
   a decoder adapted to retrieve data encoded in the scanned optical code symbols using a relaxed DBP signal comprised of a plurality of transmission slots; and
   a configurable communication interface configured to generate the relaxed DBP signal using the DBP signal and communicatively coupled to the scan engine and the decoder, wherein the relaxed DBP signal is independent of both a scan rate used by the scan engine when scanning optical code symbols and a distance between optical code symbols and the scan engine during a scanning operation.

14. The system of claim 13, wherein the plurality of transmission slots are of a fixed duration, and wherein the configurable communication interface is further configured to:
   for each code pattern received, calculate a minimum pulse duration that enables transmission of that code pattern within the fixed duration;
   scale a narrowest pulse in the pulse sequence to the minimum duration calculated for that code pattern; and
   upon scaling the narrowest pulse in the pulse sequence, scale remaining pulses in the pulse sequence to maintain a relative proportionality of each pulse width in the pulse sequence.

15. The system of claim 13, wherein the plurality of transmission slots are of a variable duration, and wherein the configurable communication interface is further configured to:
   for each code pattern received, scale a narrowest pulse in the pulse sequence to a fixed minimum pulse duration, wherein the fixed minimum pulse duration is provided in advance; and
   upon scaling the narrowest pulse in the pulse sequence, scale remaining pulses in the pulse sequence to maintain a relative proportionality of each pulse width in the pulse sequence.

16. The system of claim 13, wherein the configurable communication interface is further configured to:
   communicatively couple the scan engine and decoder using a plurality of interface families implemented with at least two interface lines, wherein one of the at least two interface lines is adapted to carry the relaxed DBP signal, and wherein one of the at least two interface lines is adapted to carry a line synchronization ("LSYNC") signal that is usable to synchronize the scan engine and/or the decoder after each transmission slot.

17. The system of claim 16, wherein one of the plurality of interface families is a Synchronous ("SYNC") interface family comprising a MASTER SYNC operating mode and a SLAVE SYNC operating mode, wherein during the MASTER SYNC operating mode the LSYNC signal is propagated in a scan engine-to-decoder direction, and wherein during the SLAVE SYNC operating mode the LSYNC signal is propagated in a decoder-to-scan engine direction.

18. The system of claim 16, wherein one of the plurality of interface families is a SERIAL interface family that supports an Inter Integrated Circuit Communications ("I2C") operating mode and a Serial-Peripheral Interface ("SPI") operating mode, wherein during the I2C operating mode the relaxed DBP signal is carried on a DATA line and the LSYNC signal is propagated in a decoder-to-scan engine direction and is carried on a CLK line, and wherein during the SPI operating mode the relaxed DBP signal is carried on a MOSI line and the LSYNC signal is propagated in a decoder-to-scan engine direction and is carried on a CLK line.

19. The system of claim 13, wherein the configurable communication interface is further configured to:
communicatively couple the scan engine and decoder using a ONE-WIRE interface family that is implemented with a single interface line adapted to carry the relaxed DBP signal, wherein the ONE-WIRE interface family is comprised of a ONE-WIRE MASTER operating mode and a ONE-WIRE MIXED operating mode, wherein during the ONE-WIRE MASTER operating mode signals carried on the single interface line are propagated in a scan engine-to-decoder direction, and wherein during the ONE-WIRE MIXED operating mode the single interface line is bidirectional.

20. The system of claim 13, wherein the scan engine is further configured to transmit localization data to the configurable communication interface, and wherein the scan engine delineates the plurality of code patterns within the DBP signal using the localization data.

* * * * *